Figure 1:
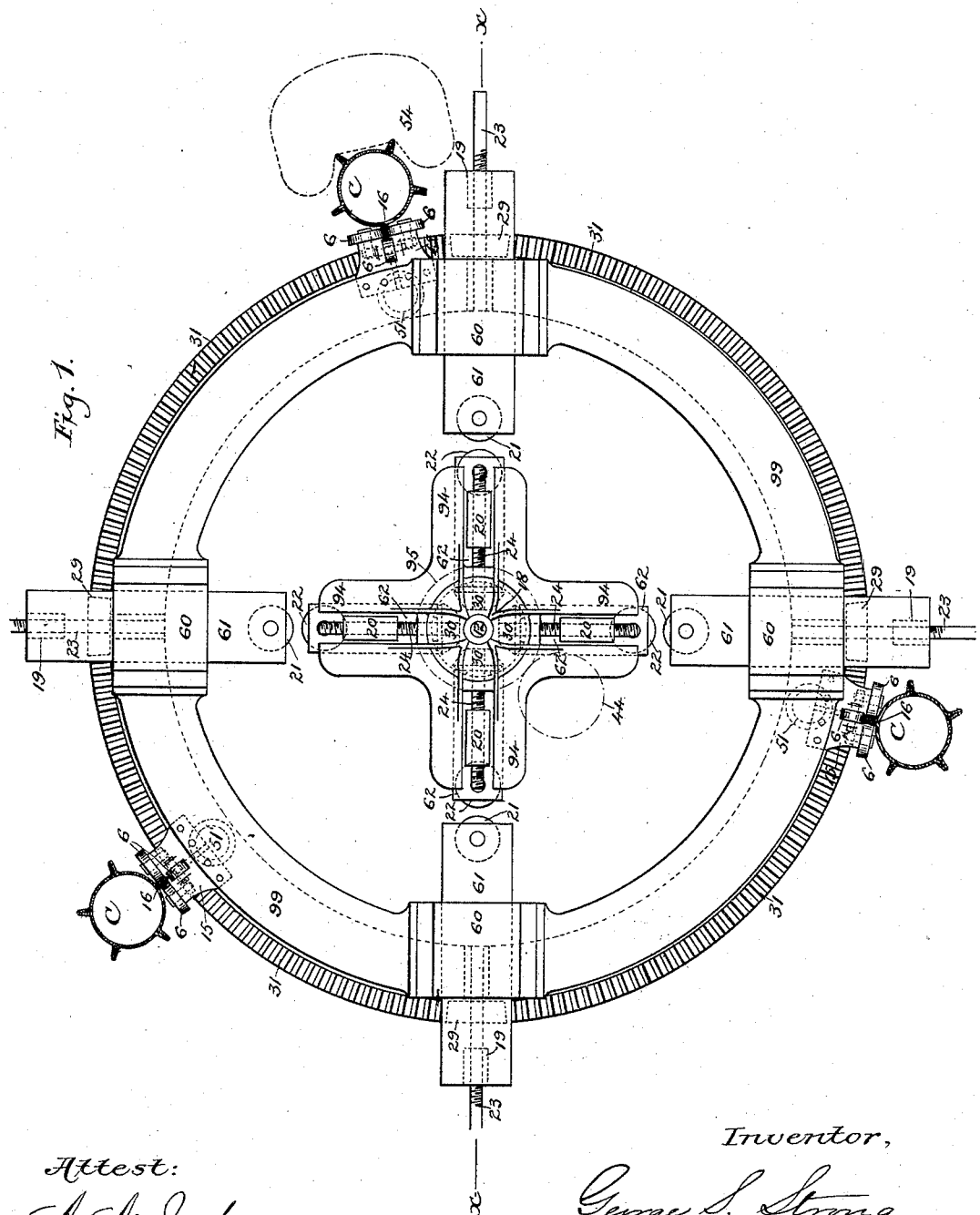

(No Model.) 3 Sheets—Sheet 1.

G. S. STRONG.
WELDING MACHINE.

No. 324,609. Patented Aug. 18, 1885.

Attest:
A. N. Jasbera
J. P. Hovey

Inventor,
George S. Strong
by
Hunsdon Philipp
Attys.

(No Model.) 3 Sheets—Sheet 2.

G. S. STRONG.
WELDING MACHINE.

No. 324,609. Patented Aug. 18, 1885.

Attest:
A. N. Jasbera
J. A. Hovey

Inventor,
George S. Strong
Munson & Philipp
Att'ys.

(No Model.)

3 Sheets—Sheet 3.

G. S. STRONG.
WELDING MACHINE.

No. 324,609. Patented Aug. 18, 1885.

Attest:

Inventor,

UNITED STATES PATENT OFFICE.

GEORGE S. STRONG, OF PHILADELPHIA, PENNSYLVANIA.

WELDING-MACHINE.

SPECIFICATION forming part of Letters Patent No. 324,609, dated August 18, 1885.

Application filed July 11, 1884. (No model.)

*To all whom it may concern:*

Be it known that I, GEORGE S. STRONG, a citizen of the United States, residing in the city of Philadelphia, county of Philadelphia, and State of Pennsylvania, have invented certain new and useful Improvements in Machines for Welding Tubes, fully described and represented in the following specification, and the accompanying drawings, forming a part of the same.

This invention relates to a mechanism which is adapted for use in welding circumferential seams in heavy iron tubes, and particularly such tubes as are designed for steam and water boilers and tanks, and for other similar purposes, and which as now commonly constructed have their seams closed by riveting.

It is the object of the invention to provide a strong and simple mechanism by which this welding can be accomplished in a rapid and reliable manner, thereby saving much of the time and labor required to form these seams by riveting, and at the same time producing a much stronger and more reliable seam and greatly improving the appearance of the finished article.

In a practical embodiment of the present invention the two or more short tubes or sections which are to be united to form the boiler or other articles, after having their ends formed so that they will telescope slightly, and thus provide a sufficient lap to form the circumferential seams, are placed in vertical position one above another upon a revolving table or support, to which the lowermost section is securely clamped. The lapped portions of the two sections are then properly heated by means of a movable annular furnace, which is especially constructed for the purpose, and which will form the subject-matter of an application for Letters Patent to be hereinafter filed by me, or by any other suitable means. Two sets of welding-rolls, one of which sets is mounted upon a vertically-moving head located inside the tube, and the other of which is mounted upon a vertically-moving annular head surrounding the tube, are moved into position opposite the heated seam-forming portions, and are adjusted horizontally, so as to be brought into contact with said portions upon the inside and the outside of the tube. The table upon which the sections are supported is then set in motion, thereby causing the sections to revolve, so as to carry the lapped portions between the welding-rolls, which rolls will be gradually adjusted into closer and closer proximity, so as to press and weld the lapped portions together and form a smooth and perfect seam.

The details in the construction of the organization thus outlined will now be fully described, in connection with the accompanying drawings, in which—

Figure 2:
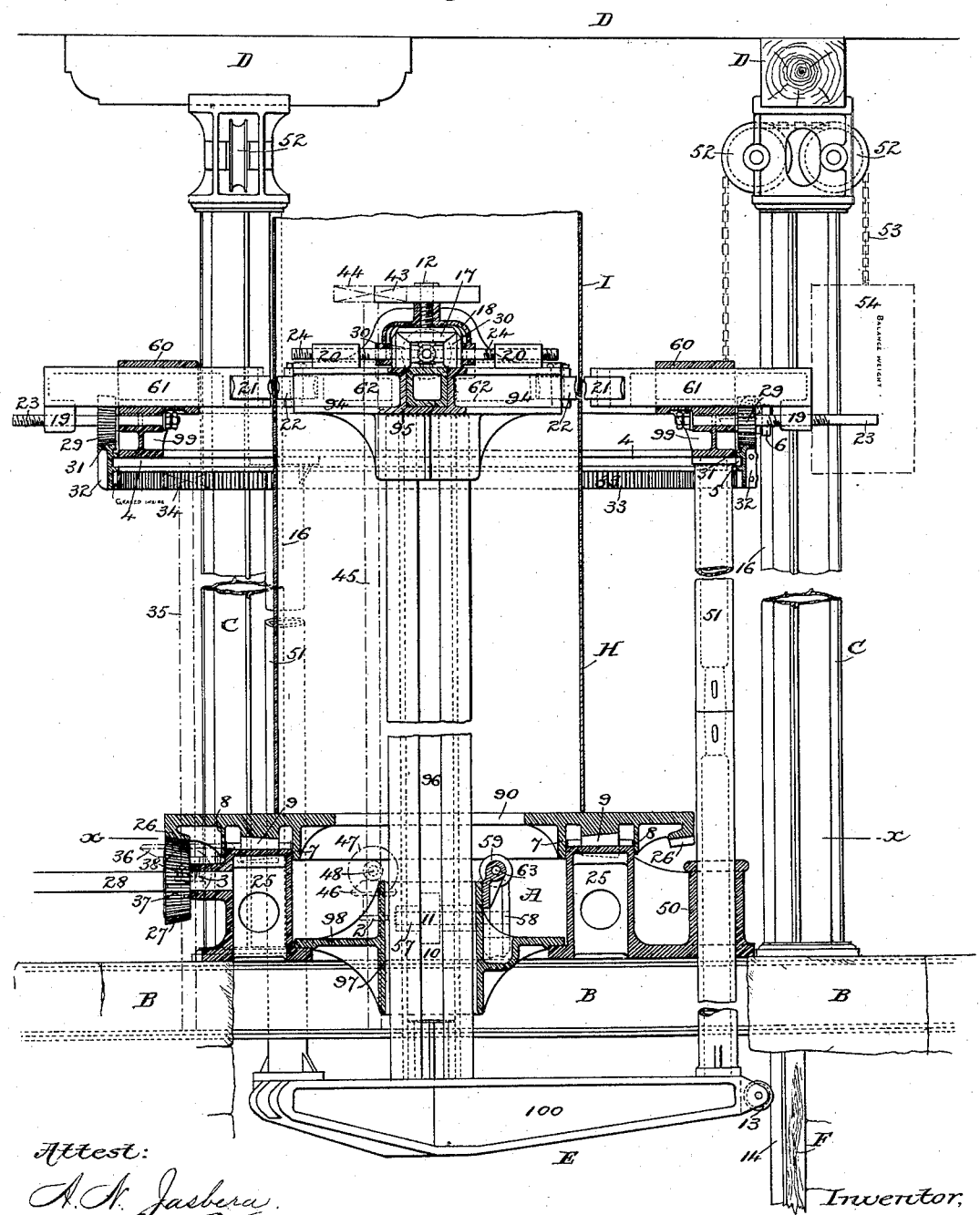
Figure 3:
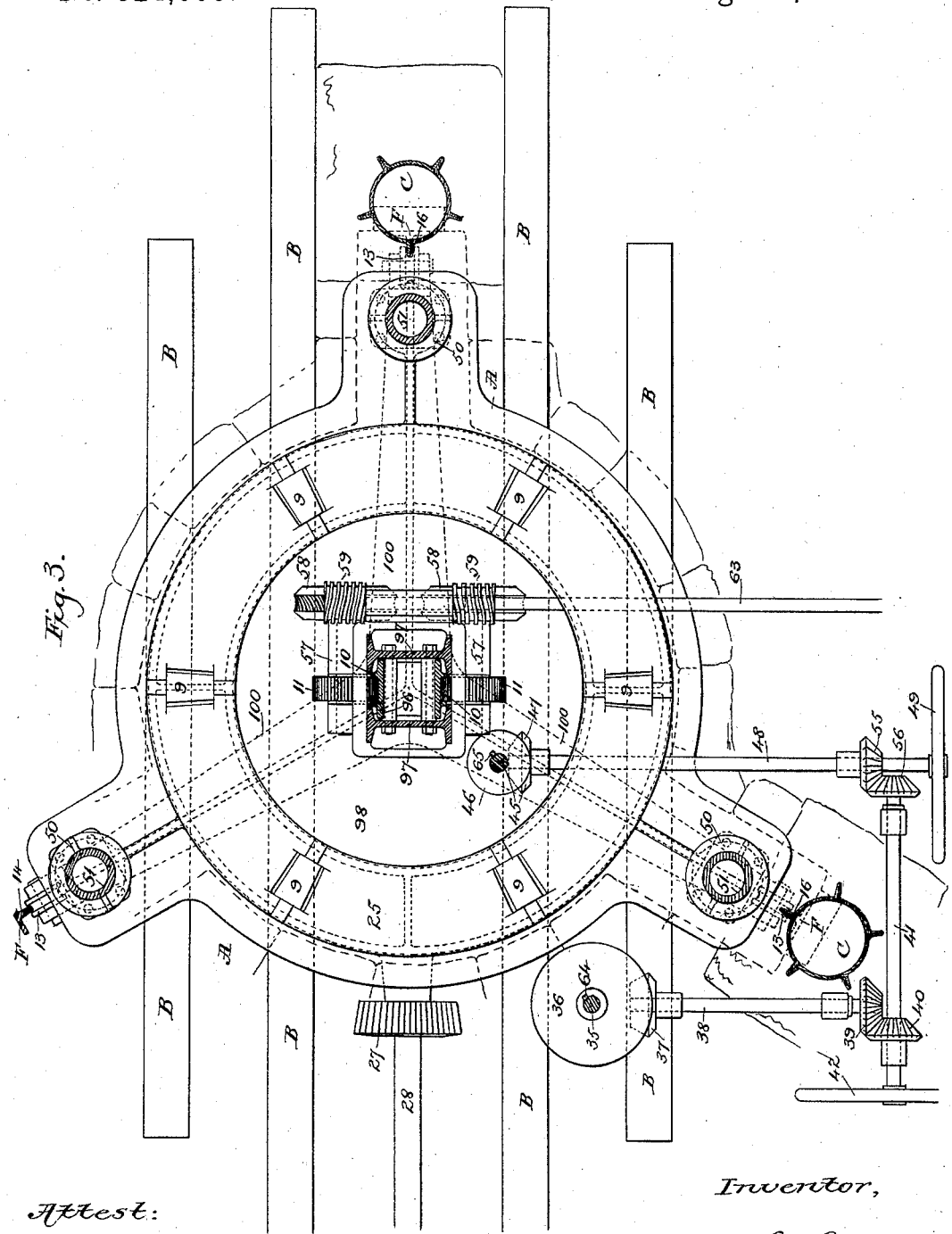

Figure 1 is a plan view, partially in section, of a mechanism embodying my present invention. Fig. 2 is a vertical sectional elevation of the same, taken upon the line $xx$ of Fig. 1; and Fig. 3 is a horizontal section of the same, taken upon the line $x\ x$ of Fig. 2.

Referring to said drawings, it is to be understood that the frame-work of the machine consists of an annular base, A, which rests upon a suitable foundation, B, and three or more columns C, which rise from the foundation B just outside of the base A, and are made fast at their upper ends in a framework, D. The columns C may be of any suitable form or construction; but in order to secure great strength and rigidity without waste of material they will preferably consist of metal tubes, as shown in the present case.

The annular base A is provided upon its upper side with a circular track, 25, which is provided with bearings for a number of conical rolls, 9, upon which rests an annular table, 90. The table 90 is provided upon its under side with a pair of annular flanges, 7 8, which fit over the edges of the track 25, so as to hold the table in place, and upon the under side of its outer edge with a circular rack, 26, which is engaged by a gear, 27, mounted upon a shaft, 28, which is connected in any convenient manner with a suitable driving mechanism.

The base A is also provided, just outside the edge of the table 90, with a number of bearings, 50, through which pass vertical columns 51, which are rigidly connected to each other at their lower ends by a frame, 100, which is arranged to move up and down in a well, E, formed in the foundation B, and is kept in proper position by means of grooved rolls 13, which engage with ribs 14, formed upon posts F, located at the sides of the well. The columns 51 are connected to each other at their upper ends by means of an annular frame, 99, which is arranged to move freely up and down between the columns C, and is provided with brackets 15, in each of which is mounted three anti-friction rolls, 6, which are arranged to run upon ribs 16, projecting from the columns C, and thus hold the frame in position.

The columns C are provided at their upper ends with pulleys 52, over which pass chains 53, the inner ends of which are secured to the frame 99, while their outer ends are provided with weights 54, which serve to balance the frames 99 100 and the parts which they carry, and permit them to be easily moved up and down to any desired position. Only one of the chains 53 and weights 54 is shown in the accompanying drawings, but it is to be understood that one of these chains and weights is provided for each of the columns C.

The annular frame 99 is provided upon its upper side with a number (four, as shown in the present case) of bearings, 60, in which are mounted horizontally-sliding heads 61, the inner ends of which are provided with welding-rolls 21, while their outer ends are provided with nuts 19, in which work threaded shafts 23, which are journaled in the frame 99, and are provided with gears 29, which engage with a rack, 31, formed upon the edge of a ring, 32, which is supported upon projections 5, which extend outward from the columns 51 and enter a groove, 4, formed upon the inner periphery of the ring. The ring 32 is also provided upon its inner periphery below the groove 4 with a rack, 33, which is engaged by a gear, 34, mounted upon the upper end of a shaft, 35, (see dotted lines in Fig. 2,) upon the lower end of which is mounted a gear, 36, (see Fig. 3,) which engages with a gear, 37, mounted upon one end of a horizontal shaft, 38, upon the opposite end of which is mounted a gear, 39, which engages with a gear, 40, mounted upon a second horizontal shaft, 41, which is provided with a hand-wheel, 42. The gear 36 is provided upon its under face with a long hub, 3, which is mounted in a bearing formed in a suitable bracket extending from the base A, and is secured to the shaft 35 by means of a spline, 64, which extends the greater part of the length of the shaft. By this means the shaft can be readily moved up and down through the gear without becoming disconnected therefrom. The purpose of this will be made apparent when the operation of the mechanism is explained.

The annular base A is provided at its bottom with a plate, 98, in the center of which is formed a long bearing, 97, through which passes a square column, 96, the lower end of which is secured to the frame 100, while upon its upper end there is mounted a frame, 95, having a number of radial arms, 94, in which are mounted horizontally-sliding heads 62, the outer ends of which are provided with welding-rolls 22, similar to the rolls 21, and arranged in the same horizontal and vertical planes. The heads 62 are provided upon their upper sides with nuts 20, in which work threaded shafts 24, which are journaled in a bracket, 18, secured to the upper side of the frame 95, and are provided with gears 30, which engage with a gear, 17, mounted upon the lower end of a short shaft, 12, the upper end of which is provided with a gear, 43, which engages with a gear, 44, mounted upon the upper end of a vertical shaft, 45, (see dotted lines in Fig. 2,) upon the lower end of which is mounted a gear, 46, (see Fig. 3,) which engages with a gear, 47, mounted upon one end of a horizontal shaft, 48, the other end of which is provided with a hand-wheel, 49, and a gear, 55, which engages with a similar gear, 56, mounted upon the shaft 41. The gear 46, like the gear 36, is provided upon its under face with a long hub, 2, which is mounted in a bearing formed in a suitable bracket extending from the base A, and is secured to the shaft 45 by means of a spline, 65, which extends the greater part of the length of the shaft. By this means the shaft 45 can also be readily moved up and down through the gear without becoming disconnected therefrom.

From this organization it will be seen that by operating either of the hand-wheels 42 or 49 the heads 61 62 can be simultaneously moved horizontally, so as to cause the welding-rolls 21 22 to approach or recede from each other, as may be desired. The purpose of this will be made apparent when the operation of the mechanism is explained.

The column 96 is provided upon opposite sides with racks 10, which are engaged by gears mounted upon short horizontal shafts 57, which are provided at their ends with worm-gears 58, which are engaged by a pair of worms, 59, mounted upon a horizontal shaft, 63, which is provided with a crank or hand-wheel, by which it can be operated.

From the foregoing it will be seen that by operating the shaft 63 the frame 100 can be adjusted up and down, so as to bring the welding-rolls 21 22 to any desired height to bring them opposite the seam upon which they are to operate.

The operation of the mechanism just described is as follows: Before placing the sections of the tube which are to be united in position the shaft 63 will be operated so as to lower the columns 51 96 through the bearings 50 97 and bring the heads 61 62 down into close proximity to the table 90. During this operation the splined shafts 35 45 will pass freely downward through the gears 36 46. As soon as the heads 61 62 have been brought to this position the sections H I of the tube which are to be united will be placed one above the other upon the table 90, with their ends slightly telescoped, as shown in Fig. 2, and the section H will be securely clamped to the table. For this purpose the table will be provided with suitable clamps arranged to grasp the lower end of the tube at different points of its circumference. If more than two sections are to be united, the third will be placed above the first two, and so on until the required number of sections are stacked together upon the table. A suitable heating apparatus will then be brought into position, so as to heat the lapped portions of the two sections to the proper degree for welding. After the lapped portions have become properly heated the heating apparatus will be removed, and the shaft 63 will be operated in the reverse direction until the heads 61 62 have been raised to a position opposite the lapped and heated portions of the sections, as shown in Fig. 2. The hand-wheel 42 or 49 will then be operated so as to cause the heads 61 62 to approach each other until the rolls 21 22 are brought into contact with the lapped portions of the sections, and the shaft 28 will then be set in motion, so as to cause the table 90 to revolve, and thus carry the lapped portions between the welding-rolls. As the table continues to revolve the hand-wheel will be operated so as to gradually force the rolls 21 22 nearer together, and thus press the lapped portions of the sections together and form a perfect weld. As soon as the weld is complete the hand-wheel will be operated in the reverse direction, so as to withdraw the rolls 21 22 from the seam, after which the heads 61 62 will be elevated, so as to weld the next seam above; or, if only two sections are to be united, the movement of the table 90 will be arrested and the heads 61 62 lowered down to the table and the completed tube removed.

As before stated, the frame 99 is guided in its up and down movement by means of the rolls 6, which run in contact with the ribs 16. These rolls and ribs also serve to prevent the frame from turning when the rolls 21 are pressed against the revolving tube during the welding operation. It is also, of course, essential that the frame 95 should be prevented from turning during this operation, and for this purpose the column 96 is made of such size as to be very stiff and rigid, and is also made square or octagonal, so as to be still further supported by its bearing 97, which is of corresponding form.

The gear 40 is connected to the shaft 41 by means of a spline, so that when desired the shaft can be moved longitudinally, so as to disconnect the gears 55 56. When these gears are thus disconnected, the wheels 42 49 can be operated so as to move the heads 61 62 independently, and thus adjust the apparatus to operate upon tubes of different sizes. After the heads 61 62 have been properly adjusted for the size of tube which is to be operated upon, the gears 55 56 will be again connected, so that the heads will be adjusted to or from each other by operating either of the wheels.

In conclusion, it is to be remarked that modifications may be made in many of the details of the mechanism herein described without departing from or losing the advantages of the invention.

The frames 99 100 and the parts which they carry may be moved up and down by other means than the rack and pinion. For example, the frame 100 may be provided with a rod which is secured to the piston of a hydraulic cylinder located in the well E; or the chains 53 may be connected to the piston-rods of similar cylinders, said cylinders in either case being arranged to operate in the same or a similar manner to those used in operating hydraulic elevators; or, in fact, any suitable mechanism or apparatus may be employed to raise and lower the welding apparatus.

It will also be seen that other mechanical devices may be substituted for those herein shown for effecting the horizontal adjustment of the welding-rolls without departing from the principle of the invention.

What I claim is—

1. The combination, with the revolving table 90, of the two sets of welding-rolls 21 22, arranged to act simultaneously upon the inside and the outside of the tube, substantially as described.

2. The combination, with the revolving table 90, of the two sets of welding-rolls 21 22, arranged to act simultaneously upon the inside and the outside of the tube, and means for moving said rolls to and from each other, substantially as described.

3. The combination, with the heads 61, carrying the rolls 21, arranged to act upon the outside of the tube, of the heads 62, carrying the rolls 22, arranged to act upon the inside of the tube, and means for simultaneously raising and lowering said heads, substantially as described.

4. The combination, with the heads 61 62, carrying the welding-rolls 21 22, arranged to act upon the inside and the outside of the tubes, of means for simultaneously raising and lowering said heads, and means for simultaneously moving said heads to and from each other, substantially as described.

5. The combination, with the revolving table 90, of the heads 61 62, carrying the welding-rolls 21 22, arranged to act upon the inside and the outside of the tube, means for simultaneously raising and lowering said heads, and means for simultaneously moving said heads to and from each other, substantially as described.

6. The combination, with the revolving table 90, of the heads 61 62, carrying the welding-rolls 21 22 and supported upon the vertically-movable columns 51 96, and the frame 100, connecting and supporting all of said columns, substantially as described.

7. The combination, with the revolving table 90, of the heads 61 62, carrying the welding-rolls 21 22 and supported upon the vertically-movable columns 51 96, the frame 100, connecting and supporting all of said columns, the annular frame 99, connecting the columns 51, and the rolls 6 and ribs 16 for holding the heads 61 in position during the welding operation, substantially as described.

8. The combination, with the columns 51 96 and the frames 95 99 100, carrying the welding apparatus, of the chains 53 and balancing-weights 54, substantially as described.

9. The combination, with the columns 51 96 and frames 95 99 100, carrying the welding apparatus, of means for raising and lowering said parts, substantially as described.

10. The combination, with the columns 51 96 and frames 95 99 100, carrying the welding apparatus, of the racks 10, gears 11, and connections for operating said gears, substantially as described.

11. The combination, with the heads 61 62, carrying the welding-rolls 21 22, of connections, substantially as described, whereby said heads can be separately and simultaneously adjusted horizontally, for the purpose set forth.

In testimony whereof I have hereunto set my hand in the presence of two subscribing witnesses.

GEO. S. STRONG.

Witnesses:
JOHN SVENSON,
C. HARRY SHOEMAKER.